United States Patent [19]
Ono et al.

[11] Patent Number: 5,181,235
[45] Date of Patent: Jan. 19, 1993

[54] ROTARY-ANODE TYPE X-RAY TUBE

[75] Inventors: Katsuhiro Ono, Utsunomiya; Hidero Anno; Hiroyuki Sugiura, both of Ootawara; Takayuki Kitami, Tochigi, all of Japan

[73] Assignee: Kabushiki Kaisha Toshiba, Kawasaki, Japan

[21] Appl. No.: 766,126

[22] Filed: Sep. 27, 1991

[30] Foreign Application Priority Data

Oct. 19, 1990 [JP] Japan .................................. 2-279350

[51] Int. Cl.$^5$ ............................................ H01J 35/24
[52] U.S. Cl. ................................. 378/133; 378/132
[58] Field of Search ................................. 378/132, 133

[56] References Cited

U.S. PATENT DOCUMENTS

| | | | |
|---|---|---|---|
| 4,210,371 | 7/1980 | Gerkema et al. | 378/133 |
| 4,562,587 | 12/1985 | Gerkema et al. | 378/133 |
| 4,641,332 | 2/1987 | Gerkema . | |
| 4,856,039 | 8/1989 | Roelandse et al. | 378/133 |

Primary Examiner—Craig E. Church
Attorney, Agent, or Firm—Cushman, Darby & Cushman

[57] ABSTRACT

In a rotary-anode type X-ray tube, a rotary anode is fixed to a cylindrical rotary structure, and a columnar stationary shaft is fit in the rotary structure. A gap is formed between the rotary structure and the stationary shaft, and the gap is filled with a liquid metal lubricant. Spiral grooves are formed in portions of the outer surface of the stationary shaft to form a sliding bearing between the stationary shaft and the rotary structure. Base members of molybdenum, tungsten, niobium, or tantalum, as surface portions, are formed on the inner surface of the rotary structure and the outer surface of the stationary shaft, and reaction layers containing the material for the base member and gallium are respectively formed on the surface portions to a thickness of 1 $\mu$m or more.

36 Claims, 6 Drawing Sheets

ROTARY-ANODE TYPE X-RAY TUBE

BACKGROUND OF THE INVENTION

1. Field of the Invention

The present invention relates to a rotary-anode type X-ray tube and, more particularly, to an improvement in the structure of a bearing for supporting a rotary-anode type X-ray tube.

2. Description of the Related Art

As is known, in a rotary-anode type X ray tube, a disk-like anode target is supported by a rotary structure and a stationary shaft having a bearing portion therebetween, and an electron beam emitted from a cathode is radiated on the anode target while the anode target is rotated at a high speed by a rotating magnetic field generated by energizing the electromagnetic coil of a stator arranged outside a vacuum envelope, thus irradiating X-rays. The bearing portion is constituted by a rolling bearing, such as a ball bearing, or a dynamic pressure type sliding bearing which has bearing surfaces with spiral grooves and uses a metal lubricant consisting of, e.g., gallium (Ga) or a gallium-indium-tin (Ga-In-Sn) alloy. Rotary-anode type X-ray tubes using the latter bearing are disclosed in, e.g., Published Examined Japanese Patent Application No. 60-21463 and Published Unexamined Japanese Patent Application Nos. 60-97536, 60-117531, and 62-287555.

In the rotary-anode type X-ray tubes disclosed in the above-mentioned official gazettes, molybdenum (Mo) or an Mo alloy, or tungsten (W) or a W alloy is used as a material for a rotary structure and a stationary shaft constituting a sliding bearing. However, a bearing surface consisting of such a metal is easily oxidized in the air in an assembly process, and the resulting oxide film causes a deterioration in wettability between the bearing surface and a liquid metal lubricant consisting of a Ga alloy. For this reason, a special process is required to remove the oxide film formed on the bearing surface, making the assembly process cumbersome. Moreover, a reliable dynamic pressure type sliding bearing function may not be obtained.

SUMMARY OF THE INVENTION

It is an object of the present invention to provide a rotary-anode type X-ray tube which ensure excellent wettability between a bearing surface and a liquid metal lubricant, and can maintain a stable operation of a dynamic pressure type sliding bearing.

According to the present invention, there is provided a rotary-anode type X-ray tube comprising:

an anode target;

a rotary structure which has a rotation center axis and to which said anode target is fixed;

a stationary structure, coaxially arranged with said rotary structure, for rotatably holding said rotary structure;

a hydrodynamic bearing formed between said rotary structure and said stationary structure, having a gap in which a metal lubricant is applied, the lubricant being in liquid state during rotation of said rotary structure, said hydrodynamic bearing including a surface layer contacted with the lubricant layer, reacted with at least one element of gallium (Ga), indium (In) bismuth (Bi) or tin (Sn) and having a thickness of not less than 1 $\mu$m.

According to the present invention, since a thin surface layer containing a refractory metal for a bearing surface base member, such as Mo or W, and gallium, or a thin surface layer containing a nitride, a carbide, or a carbonitride ceramic material for a bearing surface base member and gallium is formed on the surface portion of each sliding bearing surface, excellent wettability between the bearing surfaces and a liquid metal lubricant is ensured, thus maintaining a stable operation of a dynamic pressure type sliding bearing. In addition, assembly of this bearing is facilitated, and a highly reliable bearing operation can be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above an the detailed description of the preferred embodiments given below, serve to explain the principles of the invention.

DETAILED DESCRIPTION OF THE PREFERRED EMBODIMENTS

The preferred embodiments of the rotary-anode type X-ray tube of the present invention will be described below with reference to the accompanying drawings. Note that the same parts are denoted by the same reference numerals throughout the drawings.

As shown in FIGS. 1 to 6, a disk-like anode target 11 consisting of a heavy metal is integrally fixed to a rotating shaft portion 13 extending from one end of a cylindrical rotary structure 12 with a screw 14. A stationary shaft 15 is fitted in the cylindrical rotary structure 12. A disk-like flange 16 is fixed to the one opening portion of the rotary structure 12. An anode support portion 17 at the one end of the stationary shaft 15 is vacuum-tightly fitted in a glass vacuum envelope 18. A hydro-dynamic pressure sliding bearing portion 19 similar to the one disclosed in each official gazette mentioned above, is formed at the fitting portion between the cylindrical rotary structure 12 and the stationary shaft 15. That is, spiral grooves 20 and 21 similar to those described in each official gazette mentioned above are formed in the outer surface and two end faces, of the stationary shaft 15, which serve as its sliding bearing surface. The sliding bearing surface of the rotary structure 12, which opposes the sliding bearing surface of the stationary shaft 15 is formed into a smooth surface or a surface in which spiral grooves or the like are formed as needed so that thrust and radial bearings are constituted. Note that a ferromagnetic cylinder 12a consisting of an iron material is fitted on an Mo member as the base member of the rotary structure 12, and a cylinder 12b consisting of a material having a low electrical resistance, e.g., copper, is fixed on the cylinder 12a.

Mo or an Mo alloy (to be simply referred to as Mo hereinafter) is used as a base member for the rotary structure 12 and the stationary shaft 15. Thin reaction layers containing Mo as a base member metal for a bearing surface and at least Ga (to be simply referred as Mo-Ga reaction layers) 31 and 32 are respectively formed on the bearing surfaces. These Mo-Ga reaction layers 31 and 32 are formed on the surfaces of the base members in advance to have thicknesses of 1 $\mu$m to 100 $\mu$m. Examples of formation of such layers will be described later.

Figure 1:
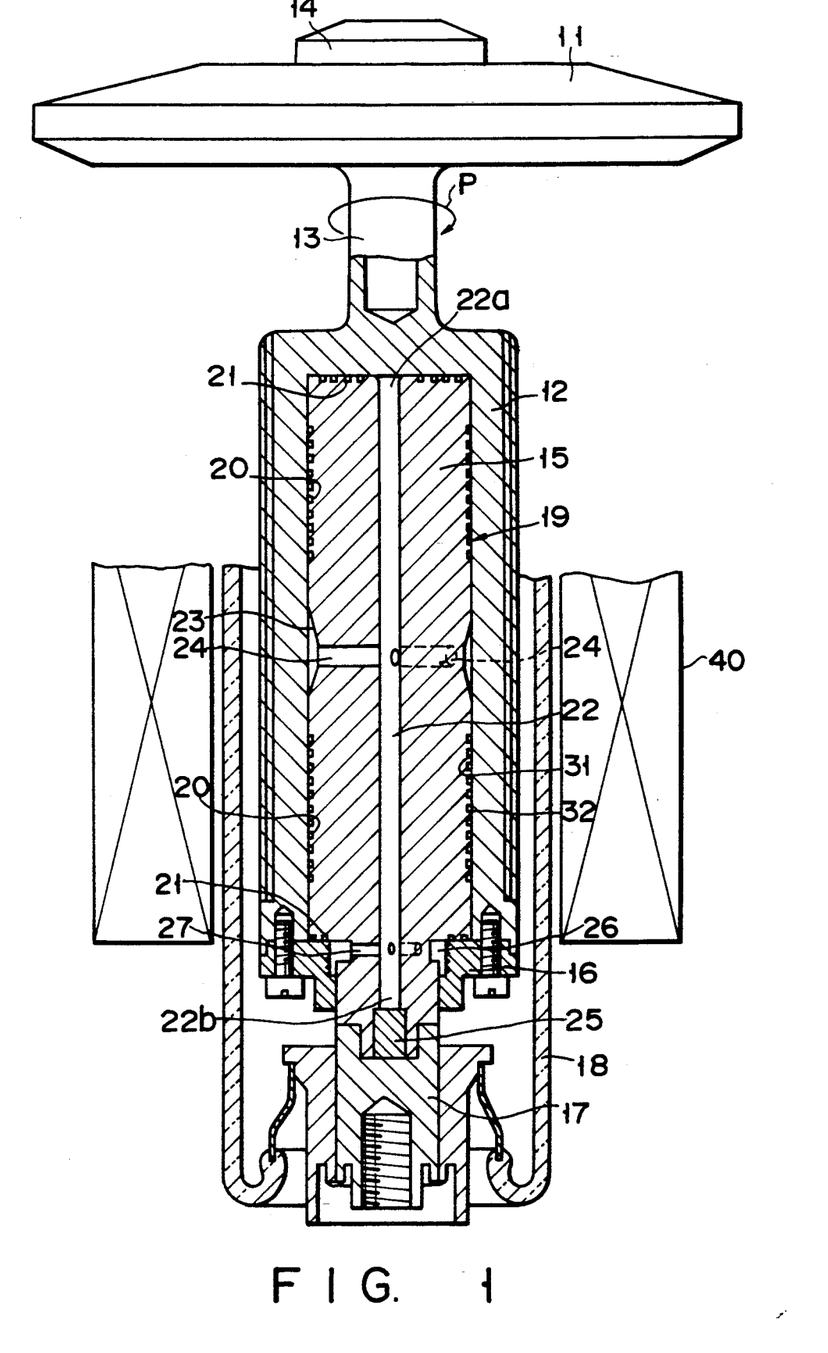
FIG. 1 is a longitudinal sectional view showing a rotary-anode X-ray tube according to an embodiment of the present invention.
Figure 2:
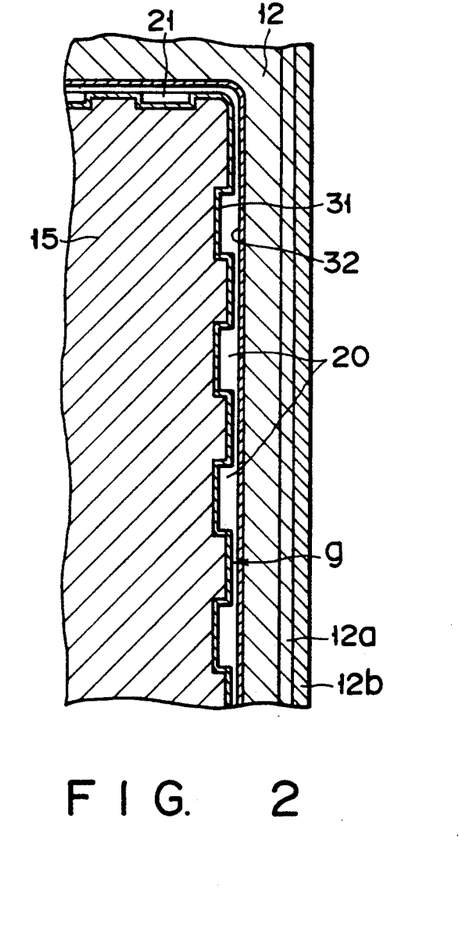
FIG. 2 is an enlarged sectional view showing a part of the X-ray tube in FIG. 1.
Figure 3:
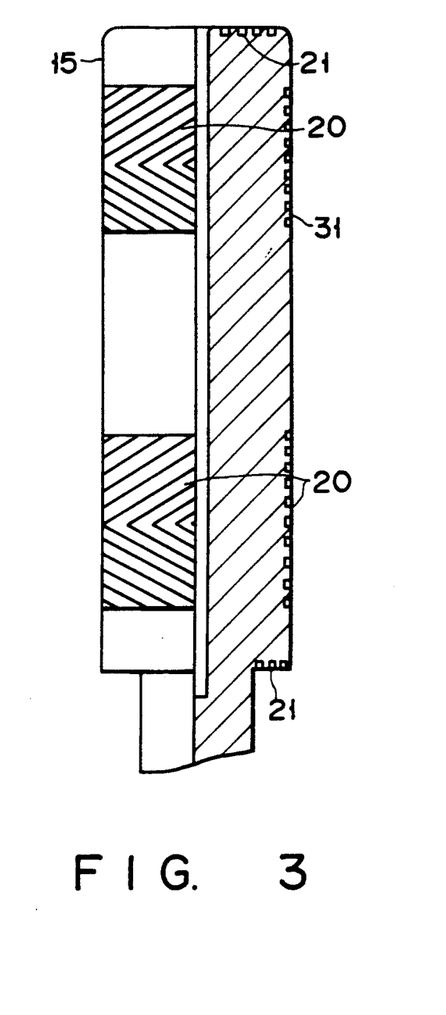
FIG. 3 is an enlarged sectional view showing a part of the X-ray tube in FIG. 1.
Figure 4:
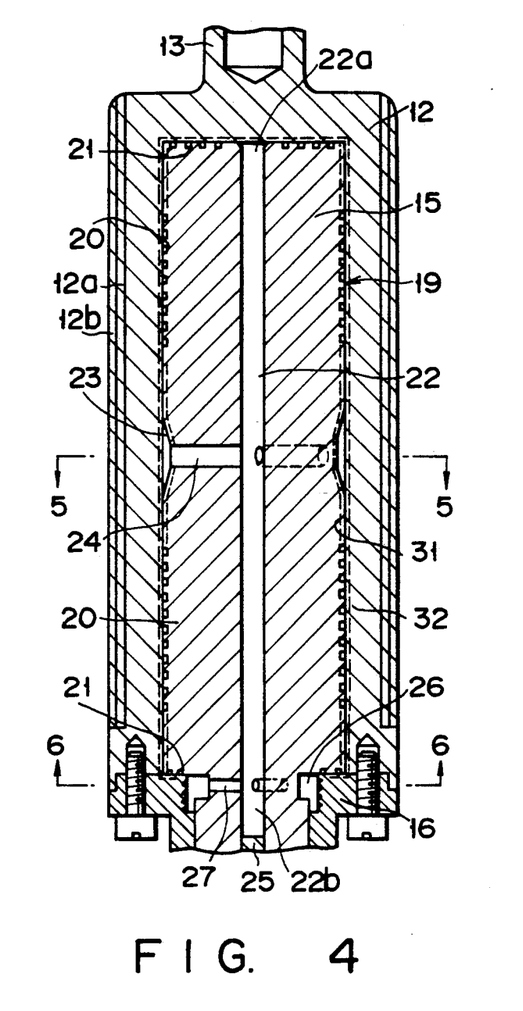
FIG. 4 is a longitudinal sectional view showing the structure of the bearing shown in FIG. 1.
Figure 5:
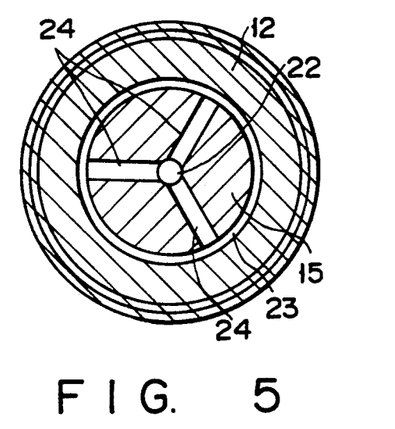
FIGS. 5 and 6 are cross-sectional views respectively taken along lines 5—5 and 6—6 in FIG. 4.
Figure 6:
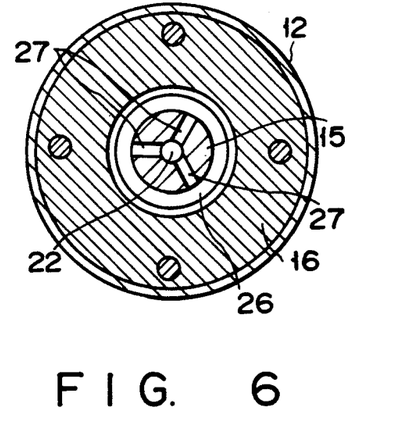

Note that the rotary structure 12 and the stationary shaft 15 are assembled to have a gap g of about 20 $\mu$m between their bearing surfaces on which the Mo-Ga reaction layers 31 and 32 are formed. A lubricant storage chamber 22 is formed in the stationary shaft 15 by forming a through hole in its central portion in the axial direction. The lubricant storage chamber 22 also serves as a circulation path for a lubricant. One end 22a of the lubricant storage chamber 22 is opened in an end face, of the outer surface of the stationary shaft 15, which has the spiral grooves 20. Thus, the lubricant storage chamber 22 is communicated with a gap of the thrust bearing. In addition, an intermediate portion of the outer surface of the stationary shaft 15 is slightly tapered to form a small-diameter portion 23, and three radial paths 24 extending from the lubricant storage chamber 22 are formed at angular intervals of 120° to be symmetrical about the axis. The lubricant paths 24 are communicated with a low-pressure space between the cylindrical rotary structure 12 and the small-diameter portion 23. The lubricant in the low-pressure space is maintained at a pressure lower than that of the gaps of the thrust and radial bearings. The other end 22b of the central lubricant storage chamber 22 is sealed by a plug 25 consisting of the same Mo material as that for the stationary shaft 15. A circumferential cavity 26 between a small diameter portion of the stationary shaft 15 and the rotary structure 12 is formed near the plug 25. Three radial paths 27 extending from the central lubricant storage chamber 22 to the circumferential cavity 26 are formed at angular intervals of 120° to be symmetrical about the axis. Thus, the lubricant storage chamber 22 is communicated with the circumferential cavity 26 through the radial paths 27 and the cavity 26 is also communicated with the gap of the thrust bearing between of the stationary shaft 15 the stepped face and the stepped inner face of the rotary structure 12. A gap g, and the spiral grooves 20 and 21 of the bearings, the paths 24 and the lubricant storage chamber 22 communicating therewith are filled with a liquid metal lubricant (not shown), as described above. Owing to the presence of the lubricant storage chamber 22, a sufficient amount of liquid metal lubricant for a long-term operation is supplied into the gaps of the bearings, when an amount of the lubricant is decreased in the gaps of the bearings, thus maintaining a required operation of the hydro-dynamic pressure type sliding bearing.

The end portion of the stationary shaft 15 is integrally brazed to the anode support portion 17 consisting of an iron material. A stator 40 having an electromagnetic coil is arranged outside the vacuum envelope as to oppose the rotary structure 12. A rotating magnetic field is generated by the stator 40 to rotate the rotary anode at a high speed in a direction indicated by P in FIG. 1. An electron beam emitted from a cathode (not shown) are impinged on the anode target 11 to irradiate X-rays. Most of the heat generated in the target 11 is dissipated by radiation, while part of the heat is transferred from the rotary structure 12 to the liquid metal lubricant and is dissipated through the stationary shaft 15. Since the Mo-Ga reaction layers 31 and 32 constituting the bearing surfaces have sufficiently high electrical and thermal conductivities as the rotary-anode type X-ray tube, they properly function as paths for anode currents and heat. In addition, the layers 31 and 32 exhibit sufficiently high mechanical strength, thus providing a rotary-anode type X-ray tube having stable bearing operation performance.

Examples of formation of the Mo-Ga reaction layers 31 and 32 on the bearing surfaces of the rotary structure 12 and the stationary shaft 15 will be described below.

In one of the examples, spiral grooves 20 and 21 having herringbone patterns are formed in predetermined portions, of the base members of the rotary structure 12 and the stationary shaft 15 consisting of Mo, which serve as bearing surfaces. These Mo base members are then heated to 700° C. in a vacuum to clean the bearing surfaces. In the same vacuum, the temperature of the base members is kept within the range of about 450° to 550° C., e.g., at 500° C., and the base members are dipped into a bath of Ga (including an alloy consisting of Ga as a main element, e.g., a Ga-In-Sn alloy). The base members are kept in the bath for a predetermined period of time and are cooled down. With this process, Mo Ga reaction layers 31 and 32, each consisting of a compound containing Mo, Ga, In, and Sn, are formed on the surfaces of the base members, thus obtaining bearing surfaces. Each of the layers 31 and 32 is diffused into the original surface of a corresponding base member to a depth of about 2.5 $\mu$m and is deposited on the surface to a thickness of about 4.5 $\mu$m and hence has a total thickness of about 7 $\mu$m.

Figure 7:
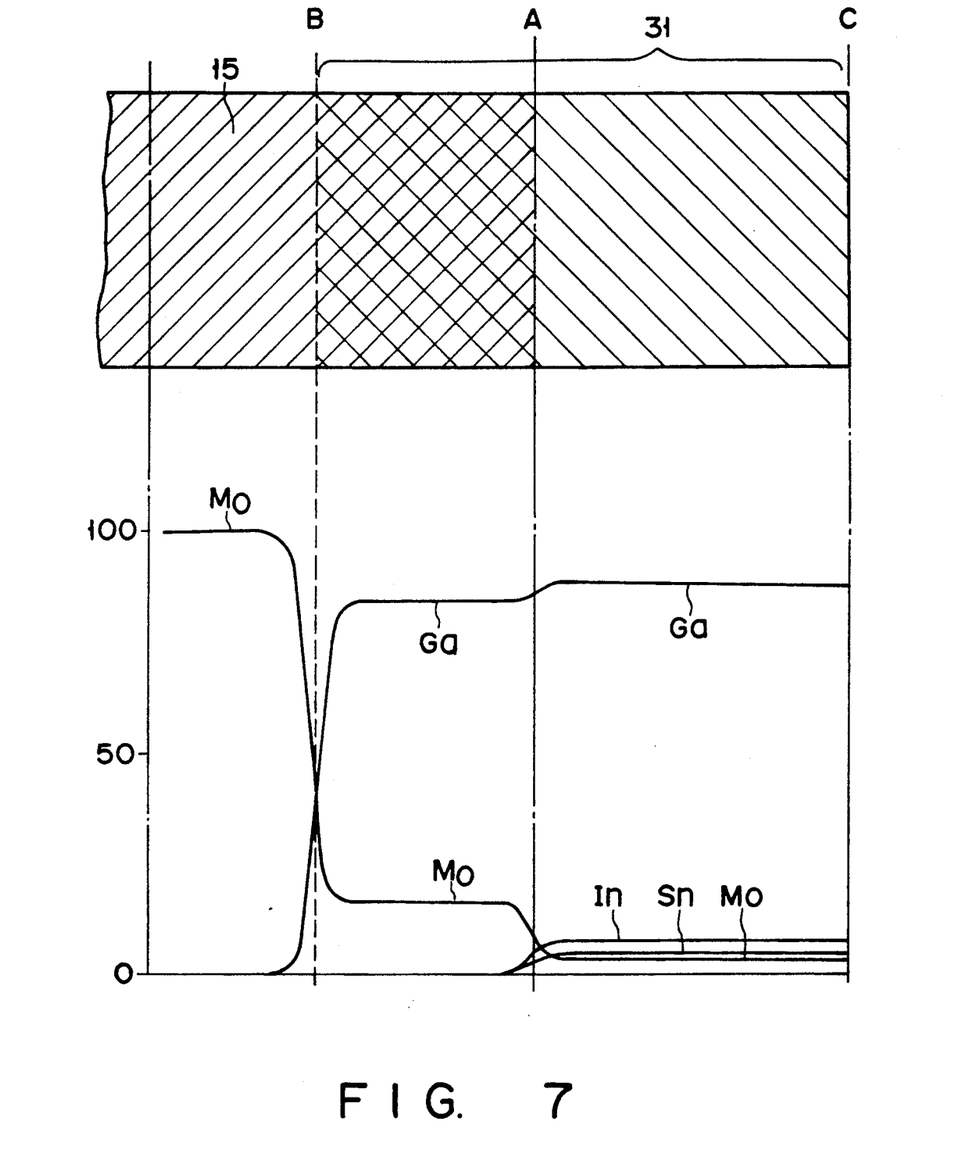
FIG. 7 is a graph showing the content ratios of metal components of the bearing shown in FIG. 1.

Note that FIG. 7 shows the distribution of the contents of the metal components at the respective positions, in the direction of depth, of the surface portion of the bearing member manufactured in this manner. This graph shows the molar ratios approximately calculated from the contents obtained by EPMA analysis. The position of an alternate long and short dashed line A in FIG. 7 corresponds to the original surface of each Mo base member. A region constituted by a metallic compound mainly consisting of Ga and Mo as the base member material, which ranges from the position A to a dotted line B can be recognized. The thickness of the region from the position A to the position B is about 2.5 $\mu$m. The ratio of Ga to Mo is abruptly reversed near the position B, and a metal region consisting of only Mo extends inward from the position B. That is, Ga in the bath is diffused in the Mo base member to form the Ga-Mo reaction layer from the original surface to the position B. In the region from the original Mo base member surface A to a surface C, a metallic compound layer consisting of Ga, In, Sn, and Mo can be recognized. Note that the surface C is a flat surface obtained by removing a rough surface portion resulting from the above-mentioned reaction process from the uppermost surface by a thickness of about 2 μm by polishing. It is confirmed that the reaction layer on this surface portion has sufficiently high hardness as a sliding bearing surface. In this manner, the Mo-Ga reaction layer 31 (or 32) is formed from the surface C to the predetermined depth position B. Note that the gap between the bearing surfaces of the rotary structure and the stationary shaft before the formation of reaction layers is set to be larger than a predetermined gap by the thickness of these reaction layers so that the predetermined gap can be formed between the bearing surfaces upon formation of the reaction layers. The low-melting metal, in the bath, which is used to form a reaction layer together with the base member metal may consists of only Ga or an alloy of Ga and another metal having a relatively low melting point.

Since the maximum temperature of the X-ray tube during an operation is about 400° C., and this state lasts only for a short period of time, the reaction layer of each bearing surface hardly changes, and the bearing surface having high hardness is maintained. In addition, even if an oxide film is formed on this reaction layer during the assembly process, this oxide film can be very easily removed. Furthermore, if a liquid lubricant consisting of Ga or a Ga alloy is filled between the bearing surfaces upon assembly of the bearing surfaces as a sliding bearing, stable direct contact can be ensured, with excellent wettability, between the bearing surfaces consisting of the Mo-Ga reaction layers and the liquid metal lubricant. Therefore, assembly is facilitated, and a satisfactory function as a dynamic pressure type sliding bearing can be obtained.

Figure 8:
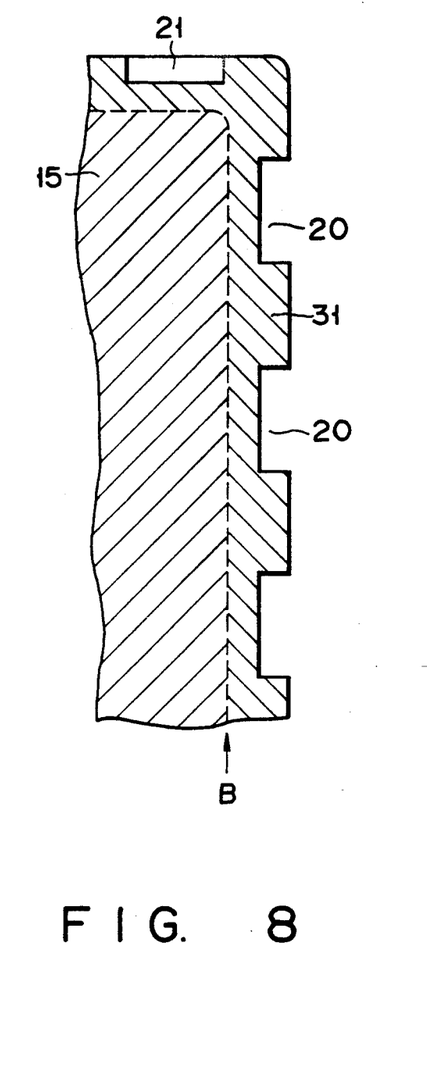
FIG. 8 is a partially enlarged longitudinal sectional view showing a rotary-anode type X-ray tube according to another embodiment of the present invention.

In the embodiment shown in FIG. 8, an Mo-Ga reaction layer 31 or 32 having a relatively large thickness of about 50 μm is formed in the surface of the base member of a rotary structure or a stationary shaft by a method similar to that described above. The surface of this reaction layer is ground to have a predetermined diameter as a bearing surface, and at the same time, spiral grooves 20 or 21 are formed in the reaction layer by a mechanical process or chemical etching. According to this manufacturing method, an X-ray tube including a dynamic pressure system sliding bearing having desired high-precision spiral grooves and a desired gap between the bearing surfaces can be manufactured.

Note that after the Mo-Ga reaction layer is formed, at least a region from a surface portion C to a original base member surface A may be removed by polishing to expose a compound layer (corresponding to the region from the position A to the position B in FIG. 7) in which Ga is diffused in Mo, and spiral grooves may be formed in the exposed compound layer as a bearing surface. With this process, an X-ray tube can be manufactured, which exhibits higher hardness at a high temperature, and has stable bearing surfaces having excellent wettability with a liquid metal lubricant.

In the above-described embodiments, surface reaction layers are independently formed on the rotary structure and the stationary shaft in the form of parts. However, the present invention is not limited to this but an X-ray tube can be manufactured in the following manner. The rotary structure and stationary shaft are manufactured and assembled in advance in such a manner that the gap between bearing surfaces is larger than that of the finished product. The gap between the bearing surfaces and a lubricant storage chamber are filled with a lubricant consisting of Ga or a Ga alloy. Thereafter, these components are heated at about 500° C. in a vacuum for a predetermined period of time and are subsequently cooled down. With this process, Mo-Ga reaction layers, each having a predetermined thickness, are respectively formed on the bearing surfaces of the rotary structure and the stationary shaft, and the remaining Ga or Ga alloy lubricant is left in the gap between the bearing surfaces, which is reduced to a predetermined gap. The gap between the bearing surfaces and the lubricant storage chamber are replenished with a Ga or Ga alloy lubricant, as needed, thus completing an X-ray tube. According to such a manufacturing method, if the amounts of Mo-Ga reaction layers to be formed are accurately managed by controlling the heat-treatment temperature and the time for the heat treatment in consideration of the gap between bearing surfaces of a finished product, the assembled structure of the rotary structure and the stationary shaft can be finished as a product without disassembling the structure, thus requiring no additional assembly steps. Therefore, such a manufacturing method is suitable for mass production.

Note that the base member of each bearing surface may be constituted by W (including an alloy mainly consisting of W), niobium (Nb) (including an alloy mainly consisting of Nb), or tantalum (Ta) (including an alloy mainly consisting of Ta). Alternatively, another metal such as iron or stainless steel, or a ceramic material may be used as a bearing constituent element, and a bearing surface base member may be formed by coating a thin layer consisting of a refractory metal, such as the one described above, on a portion, of the bearing constituent element, which serves as a bearing surface. If these refractory metals are used as bearing surface base members, the thicknesses of reaction layers consisting of these base member metals and Ga and formed on the surface portion thereof must be set to be 1 μm or more in order to facilitate control of the formation of the reaction layers.

The base member of a bearing surface may be constituted by a ceramic material such as titanium nitride, zirconium nitride, or a ceramic material such as vanadium carbide, titanium carbide, or niobium carbide. Alternatively, the base member may be constituted by a carbonitride ceramic material such as vanadium carbonitride or titanium carbonitride.

Figure 9:
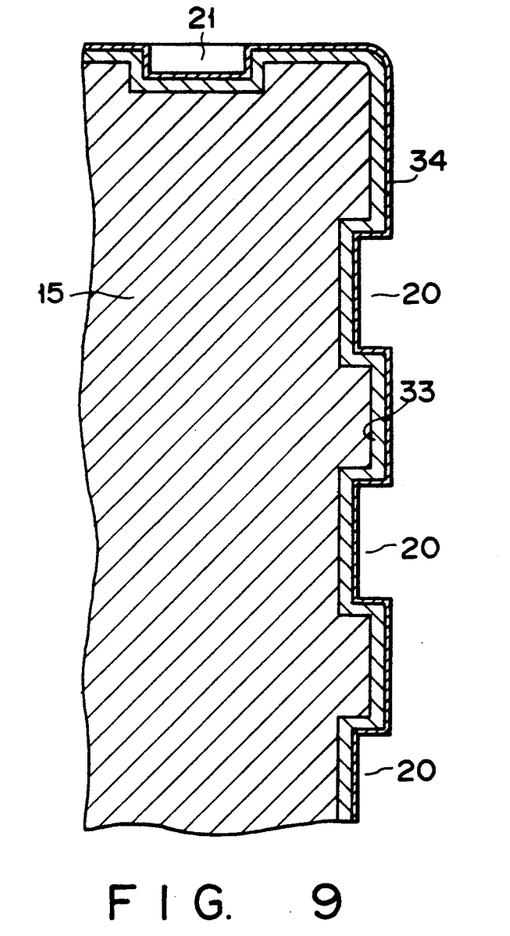
FIG. 9 is a partially enlarged longitudinal sectional view showing a rotary-anode type X-ray tube according to still another embodiment of the present invention.

In addition, a bearing surface base member may be formed by coating a layer consisting of a nitride, a carbide, or a carbonitride ceramic material on a surface portion of another metal. If a bearing surface base member consisting of a nitride, a carbide, or a carbonitride ceramic material is to be formed, the thickness of a reaction layer consisting of the bearing surface base member and Ga or Bi is preferably set to be 1 μm or more in order to facilitate control of formation of the reaction layers. More specifically, as shown in FIG. 9, the CVD method is employed to deposit a titanium nitride ceramic layer 33 having a thickness of several μm on a bearing surface portion, of a stationary shaft 15, in which spiral grooves 20 and 21 are formed in advance. In addition, a reaction layer 34 consisting of titanium nitride and Ga or Bi may be formed on the resultant surface to a thickness of about 2 μm, thereby forming a bearing surface.

Note that since the reaction layer consisting of the bearing surface base member and Ga or Bi has electrical conductivity, the layer can also be used as part of a path of an anode current for the X-ray tube.

The present invention is not limited to a lubricant mainly consisting of Ga, e.g., a Ga, Ga-In, or Ga-In-Sn lubricant. For example, a lubricant consisting of an alloy containing a relatively large amount of bismuth (Bi), e.g., a Bi-In-Pb-Sn alloy, or a lubricant consisting of an alloy containing a relatively large amount of In, e.g., an In-Bi or In-Bi-Sn alloy, may be used. Since these materials have melting points higher than the room temperature, it is preferable that a metal lubricant consisting of such a material be preheated to a temperature higher than its melting point before an anode target is rotated.

As has been described above, according to the present invention, since a thin reaction layer containing a bearing surface base member and at least Ga is formed on a surface portion of a sliding bearing surface, excellent wettability between this bearing surface and a liquid metal lubricant can be ensured, thereby maintaining a stable operation of a dynamic pressure type sliding bearing. In addition, there is provided a rotary-anode type X-ray tube which allows easy assembly of a bearing and has a highly reliable bearing function.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A rotary-anode type X-ray tube comprising:
   an anode target;
   a rotary structure which has a rotation center axis and to which said anode target is fixed;
   a stationary structure, coaxially arranged with said rotary structure, for rotatably supporting said rotary structure; and
   a hydrodynamic bearing formed between said rotary structure and said stationary structure, said hydrodynamic bearing having a gap in which a metal lubricant is applied, the metal lubricant being in liquid state during rotation of said rotary structure, said hydrodynamic bearing including a reaction layer in contact with the metal lubricant, the reaction layer having been reacted with at least one element of gallium (Ga), indium (In), bismuth (Bi) or tin (Sn) and having a thickness greater than or equal to 1 μm.

2. An X-ray tube according to claim 1, wherein at least one of said rotary and stationary structures is made of a material selected from the group essentially consisting of molybdenum (Mo), tungsten (W), niobium (Nb), and tantalum (Ta), and said reaction layer is formed on the one of the rotary and stationary structures.

3. An X-ray tube according to claim 1, wherein the metal lubricant is selected from a group essentially consisting of an alloy of gallium (Ga), indium (In), bismuth (Bi), and tin (Sn).

4. An X-ray tube according to claim 1, wherein at least one of said rotary and stationary structures has a coating layer made of a material selected from a group essentially consisting of molybdenum (Mo), tungsten (W), niobium (Nb), and tantalum (Ta), and said reaction layer is formed on the one of the rotary and stationary structures.

5. A rotary-anode type X-ray tube comprising:
   an anode target;
   a rotary structure which has a rotation center axis and to which said anode target is fixed;
   a stationary structure, coaxially arranged with said rotary structure, for rotatably supporting said rotary structure;
   a hydrodynamic bearing formed between said rotary structure and said stationary structure, said hydrodynamic bearing having a gap in which a metal lubricant is applied, the metal lubricant being in liquid state during rotation of said rotary structure, said hydrodynamic bearing including a reaction layer in contact with the metal lubricant, the reaction layer having been reacted with at least one element of gallium (Ga), indium (In), bismuth (Bi) or tin (Sn); and
   a lubricant storage chamber for receiving the metal lubricant, said lubricant storage chamber formed by at least one of said stationary and rotary structures, the one of said stationary and rotary structures being arranged on the rotation center axis, said lubricant storage chamber communicate with the gap in said hydrodynamic bearing.

6. An X-ray tube according to claim 5, wherein said lubricant storage chamber is formed along the rotation center axis.

7. An X-ray tube according to claim 5, wherein said hydrodynamic bearing includes a thrust-bearing having a gap and said lubricant storage chamber has an opening communicating with the gap of the thrust bearing.

8. An X-ray tube according to claim 5, wherein said hydrodynamic bearing includes radial bearings having gaps and said lubricant storage chamber includes a path having an opening arranged between said radial bearings and communicating with the gaps of said radial bearings.

9. An X-ray tube according to claim 8, wherein said rotary and stationary structures define a low-pressure space formed therebetween, said low-pressure space is arranged between said radial bearings and communicates with the gaps of said radial bearings and said lubricant storage chamber; and the opening of said lubricant storage chamber opens into said low-pressure storage space.

10. An X-ray tube according to claim 5, wherein said hydrodynamic bearing includes thrust and radial bearings having gaps, and said lubricant storage chamber includes a path opened between said thrust and radial bearings which communicates with the gaps of said thrust and radial bearings.

11. An X-ray tube according to claim 5, further comprising sealing means for sealing said hydrodynamic bearing.

12. An X-ray tube according to claim 11, wherein said sealing means includes a cavity defined by said rotary and stationary structures, and said cavity communicates with the gap of said hydrodynamic bearing and said lubricant storage chamber.

13. An X-ray tube according to claim 5, wherein said lubricant chamber has an opening which communicates with the gap of said hydrodynamic bearing, the rotation center axis passing through the opening.

14. An X-ray tube according to claim 5, wherein said stationary structure has a columnar shape and is rotatably inserted in the rotary structure, and said lubricant storage chamber is formed in said stationary chamber.

15. An X-ray tube according to claim 14, wherein said stationary structure has an outer surface, said rotary structure has an inner surface and said hydrodynamic bearing includes spiral grooves formed on at least one of the outer surface of said stationary structure and the inner surface of said rotary structure.

16. An X-ray tube according to claim 5, wherein said rotary structure has a columnar shape and is inserted in said stationary structure and said lubricant storage chamber is formed in said rotary structure.

17. An X-ray tube according to claim 16, wherein said rotary structure has an outer surface, said stationary structure has an inner surface and said hydrodynamic bearing includes spiral grooves formed on at least one of the outer surface of said stationary structure and the inner surface of said rotary structure.

18. An X-ray tube according to claim 15, wherein the reaction layer has a thickness of greater than or equal to 1 $\mu$m.

19. A rotary-anode type X-ray tube comprising:
an anode target;
a rotary structure which has a rotation center axis and to which said anode target is fixed;
a stationary structure, coaxially arranged with said rotary structure, for rotatably supporting said rotary structure;
a hydrodynamic bearing formed between said rotary structure and said stationary structure, said hydrodynamic bearing having a gap in which a metal lubricant is applied, the metal lubricant being in liquid state during rotation of said rotary structure, said hydrodynamic bearing including a bearing surface formed on at least one of said stationary and rotary structures, and said bearing surface including a material selected from the group essentially consisting of nitride ceramic, carbide ceramic, and carbonitride ceramic.

20. An X-ray tube according to claim 18, wherein the metal lubricant is selected from a group essentially consisting of an alloy of gallium (Ga), indium (In), bismuth (Bi), and tin (Sn).

21. An X-ray tube according to claim 18, wherein at least one of said rotary and stationary structures has a coating layer made of a material selected from a group essentially consisting of nitride ceramic, carbide ceramic, and carbonitride ceramic.

22. An X-ray tube according to claim 18, wherein a reaction layer in contact with the metal lubricant is formed on said bearing surface, the reaction layer has been reacted with at least one element of gallium (Ga), indium (In), bismuth (Bi) or tin (Tn) and has a thickness of greater than or equal to 1 $\mu$m.

23. An X-ray tube according to claim 18, further comprising:
a lubricant storage chamber for receiving the metal lubricant, said lubricant storage chamber formed by at least one of said stationary and rotary structures, the one of said stationary and rotary structures being arranged on the rotation center axis, said lubricant storage chamber communicating with the gap in said hydrodynamic bearing.

24. An X-ray tube according to claim 23, wherein said lubricant storage chamber is formed along the rotation center axis.

25. An X-ray tube according to claim 23, wherein said hydrodynamic bearing includes a thrust-bearing having a gap and said lubricant storage chamber has an opening communication with the gap of the thrust bearing.

26. An X-ray tube according to claim 23, wherein said hydrodynamic bearing includes radial bearings having gaps and said lubricant storage chamber includes a path having an opening arranged between said radial bearings and communication with the gaps of said radial bearings.

27. An X-ray tube according to claim 23, wherein said rotary and stationary structures define a low-pressure space formed therebetween, said low-pressure space is arranged between said radial bearings and communicates with the gaps of said radial bearings and said lubricant storage chamber; and the opening of said lubricant storage chamber opens into said low-pressure storage space.

28. An X-ray tube according to claim 23, wherein said hydrodynamic bearing includes thrust and radial bearings having gaps and said lubricant storage chamber includes a path opened between said thrust and radial bearings which communicates with the gaps of said thrust and radial bearings.

29. An X-ray tube according to claim 23, further comprising sealing means for sealing said hydrodynamic bearing.

30. An X-ray tube according to claim 29, wherein said sealing means includes a cavity defined by said rotary and stationary structures, and said cavity communicates with the gap of said hydrodynamic bearing and said lubricant storage chamber.

31. An X-ray tube according to claim 23, wherein said lubricant chamber has an opening which communicates with the gap of said hydrodynamic bearing, the rotation center passing through the opening.

32. An X-ray tube according to claim 23, wherein said stationary structure has a columnar shape and is rotatably inserted in the rotary structure, and said lubricant storage chamber is formed in said stationary structure.

33. An X-ray tube according to claim 32, wherein said stationary structure has an outer surface, said rotary structure has an inner surface and said hydrodynamic bearing includes spiral grooves formed on at least one of the outer surface of said stationary structure and the inner surface of said rotary structure.

34. An X-ray tube according to claim 23, wherein said rotary structure has a columnar shape and is inserted in said stationary structure and said lubricant storage chamber is formed in said rotary structure.

35. An X-ray tube according to claim 34, wherein said rotary structure has an outer surface, said stationary structure has an inner surface and said hydrodynamic bearing includes spiral grooves formed on at least one of the outer surface of said stationary structure and the inner surface of said rotary structure.

36. An X-ray tube according to claim 18, wherein at least one of said rotary and stationary structures is made of a material selected from the group essentially consisting of nitride ceramic, carbide ceramic, and carbonitride ceramic.

* * * * *